(12) United States Patent
Fabian et al.

(10) Patent No.: US 6,496,635 B1
(45) Date of Patent: Dec. 17, 2002

(54) COATED OPTICAL FIBER

(75) Inventors: Michelle D. Fabian, Horseheads, NY (US); Gregory F. Jacobs, Elmira, NY (US); Huan-Hung Sheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/723,159

(22) Filed: Nov. 27, 2000

Related U.S. Application Data
(60) Provisional application No. 60/174,007, filed on Dec. 30, 1999.

(51) Int. Cl.$^7$ .............................. G02B 6/02; G02B 6/22
(52) U.S. Cl. ...................................... 385/128; 385/144
(58) Field of Search ................................ 385/100–132, 385/141–146; 427/163.2, 333

(56) References Cited

U.S. PATENT DOCUMENTS

| | | | |
|---|---|---|---|
| 4,531,959 A | | 7/1985 | Kar et al. |
| 4,624,994 A | | 11/1986 | Ansel ........................ 350/96.34 |
| 4,682,851 A | | 7/1987 | Ansel ........................... 525/440 |
| 5,140,665 A | | 8/1992 | Backer et al. |
| 5,181,269 A | * | 1/1993 | Petisce ......................... 385/128 |
| 5,330,786 A | * | 7/1994 | Nonaka et al. ........... 427/163.2 |
| 5,459,175 A | * | 10/1995 | Woods et al. ................ 522/180 |
| 5,664,041 A | | 9/1997 | Szum |
| 5,721,800 A | | 2/1998 | Kato et al. |
| 5,852,701 A | | 12/1998 | Kato et al. |
| 6,072,929 A | | 6/2000 | Kato et al. |
| 6,085,010 A | | 7/2000 | Zahora et al. |
| 6,187,835 B1 | * | 2/2001 | Szum et al. ................... 522/96 |
| 6,306,924 B2 | * | 10/2001 | Szum ........................... 385/128 |
| 6,316,105 B1 | * | 11/2001 | Khudyakov et al. ......... 385/145 |

OTHER PUBLICATIONS

Fowkes, F.M., "Acid–Base Interactions in Polymer Adhesion", 1983, Plenum Press New York, vol. 2, pp. 583–603.*
Fowkes, F.M. "Role of acid–base interfacial bonding in adhesion", Journal of Adhesion Science Technology. vol. 1, p. 7, 1987.*
Rayss et al. "Influence of the fused silica surface dehydroxylation on the adhesion of epoxyacrylate protective coatings used for optical fibers", Journal of Adhesion Science Technology. vol. 12, No. 3, pp. 293–303. (No Date).*
Rayss et al, "Influence of the fused silica surface dehydroxylation on the adhesion of epoxyacrylate protective coatings used for optical fibers", Journal of Adhesion Science and Technology, 1998, vol. 12, No. 3, pp. 293–303.
$5^{th}$ International Coatings for Plastics Symposium, May 20–22, 2002, Troy Michigan, Agenda.
Abstract, SciFinder, "Intercoat adhesion and (acid or base)", May 3, 2002.
Abstract, SciFinder, "Intercoat adhesion", May 3, 2002.

* cited by examiner

*Primary Examiner*—John D. Lee
*Assistant Examiner*—Michelle R. Connelly-Cushwa
(74) *Attorney, Agent, or Firm*—Timothy R. Krogh

(57) ABSTRACT

The disclosed invention is a coated optical waveguide. The invention includes an optical waveguide and a first coating encompassing the optical waveguide. The first coating has at least one functional group that is a selected from the group consisting of an acidic group or a basic group. The invention also includes a second coating having at least one functional group. The second coating is bonded to the first coating. The functional group of the second coating is a basic group when the first coating functional group is an acidic group. The second coating functional group is an acidic group when the first coating functional group is a basic group. The disclosed invention also includes the method of making the coated optical fiber. The disclosed invention further includes a method of controlling optical waveguide inter coating adhesion. The acid/base character between a plurality of adjacent coating layers is alternated.

27 Claims, 1 Drawing Sheet

COATED OPTICAL FIBER

CROSS-REFERENCE TO RELATED APPLICATIONS

This is application claims the benefit of U.S. Provisional Patent Application Serial No. 60/174,007 filed on Dec. 30, 1999, the content of which is relied upon and incorporated herein by reference in its entirety, and the benefit of priority under 35 U.S.C. §120 is hereby claimed.

BACKGROUND OF THE INVENTION

The present invention relates generally to optical waveguides ("OWGs"), and particularly to the composition of the coatings applied to the OWG.

The use of OWGs is becoming more and more prevalent in the telecommunications industry. This trend is definitely apparent in the area of reliable long-range communications. In the case of long-range communications, the entire distance between telephone company switching offices is actually numerous OWGs connected to each other in a series alignment. An individual strand of an OWG may be as long as fifty (50) kilometers or more.

The typical OWG utilized consists of a glass fiber with a primary and secondary coating. The secondary coating is an exterior coating of the primary coating.

As a matter of cost savings and practicality, a plurality of coated OWGs are bundled into a final fiber optics cable. This plurality of OWGs is installed at one time. The plurality of OWGs is typically in a loose tube or ribbon format. Each one of the OWGs is spliced and connected to another OWG in the series alignment described above. This splicing together of two OWGs, aligned in series, is repeated until the entire length of OWGs extends between one switching office to another switching office.

In installing the OWG in the cable format and splicing the various OWGs together, the identification of each individual strand of fiber is important. To assist in the identification, each OWG is typically inked. Some OWGs have colored coatings that can be used for identification. The identification mechanism of inking may be color, a pattern applied to the OWG, or any other suitable technique to quickly identify objects to be spliced together.

Each OWG is extensively handled at each junction where two cables are spliced together. The adherence of the ink to the coated OWG is very important at this point. Typical problems that may be encountered include peeling, flaking, or pitting. Also the ink should not delaminate from the coating.

SUMMARY OF THE INVENTION

One aspect of the present invention is a coated OWG. The coated OWG includes an OWG having a first coating encompassing the OWG. The first coating has at least one functional group that is selected from a group consisting of an acidic group or a basic group. The coated OWG also includes a second coating having at least one functional group. The second coating functional group is a basic group when the first coating functional group is an acidic group. Alternatively, the second coating functional group is an acidic group when the first coating functional group is a basic group. The second coating is bonded to the first coating. The second coating may also include an ink. This aspect of the invention may also include additional adjacent coatings in which the acid/base character of each individual coating alternates between the respective adjacent coatings.

Another aspect of the present invention includes either the first or second coating having the acidic functional group in a greater amount than stoichiometric amount of the basic functional group.

A further aspect of the invention includes a method of coating an OWG. The method includes applying the first coating having at least one functional group that is selected from a group consisting of an acidic group or a basic group to the OWG. The method also includes applying the second coating having at least one functional group to the first coating, thereby bonding the second coating to the first coating. The second coating functional group is a basic group when the first coating functional group is an acidic group. Alternatively, the second coating functional group is an acidic group when the first coating functional group is a basic group.

An additional aspect of the invention includes a method of controlling optical waveguide inter coating adhesion. Acid/base character is alternated between a plurality of adjacent coating layers.

The coated OWG of the invention results in a several advantages over the prior art. For example, an OWG coated in accordance with the invention has exhibited improved adhesion between the first coating and the second coating. Consequently, the second coating of the invention has exhibited improved abrasion resistance and is less susceptible to peeling, flaking, or pitting.

Another advantage of the invention is an enhancement in the total adhesion strength of the coatings. The advantages also include high molecular adhesion between the coatings which include the bonded functional groups as well as increased adhesive strength. This may also be used to control the adhesion between coatings by means of acid/base interaction.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
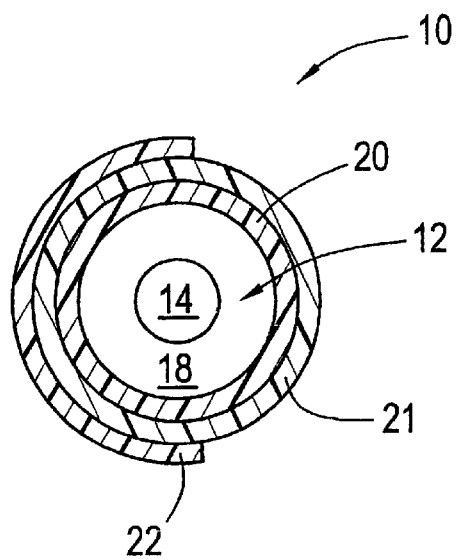
FIG. 1 is a cross sectional view of one embodiment of a coated OWG made in accordance with the invention.

Reference will now be made in detail to the present preferred embodiment of the invention, an example of which is illustrated in the accompanying drawings. Wherever possible, the same reference numbers will be used throughout the drawings to refer to the same or like parts. An exemplary embodiment of the coated OWG of the present invention is shown in FIG. 1, and is designated generally throughout by reference numeral 10.

In accordance with the invention, the present invention for a coated OWG 10 includes an OWG 12. The OWG 12 may be constructed from glass, plastic, or any other suitable material. The OWG 12 includes a core 14 and a cladding 18. The invention is not limited to the OWG 12 shown in FIG. 1. Any type of OWG that may be coated may be used to practice the invention.

The OWG 12 has a first coating 20 applied to the OWG 12. The coating 20 encompasses the OWG 12. In a preferred embodiment the coating 20 is a primary coating. The primary coating 20 is a coating designed to relieve the application of force or stresses upon the OWG 12.

The coating 20 includes at least one functional group that is either an acidic group or a basic group. Preferably, the coating 20 will include a plurality of functional groups that are either acidic or basic. The coating should not contain a mixture of acidic and basic functional groups. The coating may be applied to the OWG by any known technique in the art. For references on how to coat optical fibers see the following U.S. Pat. No. 5,664,041 issued to Szum, U.S. Pat. No. 5,140,665 issued to Backer et al., and U.S. Pat. No. 4,531,959 issued to Kar et al. The aforementioned patents are incorporated herein by reference in their entirety.

A second coating 21 is applied to the coating 20. The coating 21 also includes at least one functional group. If the coating 20 includes an acidic functional group, the second coating 21 includes a basic functional group. Likewise, if the coating 20 includes a basic functional group, the second coating 21 includes an acidic functional group. When the second coating 21 is applied to the coating 20, the functional groups in the second coating 21 and coating 20 react and form a bond containing ionic interactions. It is further preferred that both the first coating 20 and the second coating 21 include a plurality of functional groups.

The second coating 21 may be referred to as a secondary coating. Secondary coatings function as a protective coating to protect the primary coating 20 and the OWG 12. Optionally, the coating 21 may include an ink for identification purposes. The coating 21 may be an outer coating in relation to the coating 20.

Preferably, the coating 20 includes the acidic functional group, however, the invention is not limited to the coating 20 including the acidic functional group. The acidic functional group may be included in either the coating 20 or the second coating 21. One suitable acidic functional group may be derived from phosphoric acid, however, the invention is not limited to acidic functional groups derived from phosphoric acid.

Typically, the acidic functional group containing component may be present in a coating in a concentration of at least 0.01% by weight of the coating 20. The upper limit of the amount of acidic functional group that may be present in a coating 20 will become apparent to someone skilled in the art. It is only limited by the properties of the coating 20 and the miscibility of the particular acid which forms the acidic functional group in the coating 20. The same is true if the acidic functional group is in the second coating 21. This is also true for the basic functional group which may be in either the coating 20 or the second coating 21.

More preferably, the coating 20 includes a reactive monomer or oligomer. The monomer or the oligomer may include the acidic functional groups. However, the invention may also be practiced if the monomer/oligomer of the coating 20 has basic functional groups, instead of acidic functional groups. Having the functional groups tied to the monomer/oligomer is preferable for at least the reason that this embodiment ties the functional groups to the chemical network of the coating and prevents any problem of mobility of the functional group. Due to the high crosslink density of the network the risk of the functional group migrating from the coating is greatly reduced. This will minimize the possibility of the basic functional group reaching a surface of the fiber and degrading the strength of the fiber, due to chemical etching at the surface of the fiber.

Preferably, the second coating 21 includes the basic functional group. The basic functional group is typically an amine, however, the invention is not limited to the use of an amine.

More preferably, the second coating 21 includes a reactive monomer and/or oligomer which contains the functional group. The functional group contained in the second coating 21 may be either the acidic functional group or the basic functional group.

As shown in FIG. 1, the invention may also include a third coating 22. The third coating 22 may be a ribbon matrix. The ribbon matrix is not required to practice the invention. The ribbon matrix may include at least one of the aforementioned functional groups. If so then the ribbon matrix will include the same functional group as the coating 20. By "the same" means that the first coating and the third coating may both have acidic functional groups or basic functional groups. It does not mean that the molecular structure exhibiting the acidic or basic character is same although it may be. For example, the acidic character of the first coating may be derived from a phosphoric acid ester of hydroxyethylacrylate and the acidic functional group of the third coating may be derived from beta-carboxyethylacrylate or acrylic acid. The invention is not limited to only 3 coatings. More than 3 coatings may be applied to the OWG 12. The acid/base character of one or more of the adjacent coatings should alternate. One example of this is that the odd numbered coatings would include acidic functional groups and the even numbered coatings would include basic functional groups. It is preferred that a coating which includes an acidic functional group is adjacent the OWG 12. Optionally, the third coating 22 may be disposed on the exterior of the second coating 21.

In an alternate embodiment, not shown, the coating 20 may be the sole coating around the OWG 12 and the second coating 21 may be an ink with the appropriate functional groups to practice the invention.

In another alternate embodiment of the invention, the primary coating may not include any acidic or basic functional groups. In this embodiment, the secondary coating would include at least one of the functional groups. An adjacent coating of this embodiment could be the ink. The ink would include the complementary functional group. For example, the secondary coating could include at least one acidic functional group. The ink applied to the secondary coating would include at least one basic functional group.

This alternate embodiment could also include a ribbon matrix. The matrix would be disposed around the coated and inked OWG. Optionally, the matrix could include complementary functional groups to those included in the ink. However, the matrix would not need to include the functional groups to practice the invention.

In a further embodiment, the coatings which include the acidic or basic functional groups may be the ink and the ribbon matrix. For example, the ink may include at least one acidic functional group and the matrix may include at least one basic functional group.

It is also preferred that the acidic functional group is present in an amount greater than the stoichiometric amount of the basic functional group. As shown in FIG. 1, the amount of acidic functional groups may be measured from both the primary coating 20 and the third coating 22. The use of excess acidic functional groups will prevent the base functional groups from migrating to the OWG 12 and corroding the OWG 12. Alternatively, this amount of acidic functional group can be measured from the amount of acidic functional groups in one layer of a multi-layer system.

In accordance with the invention, the present invention further includes a method of coating an OWG. The method includes applying the coating 20 having at least one functional group to the OWG 12. The second coating 21 having at least one functional group is applied to the coating 20.

The invention also includes a method of controlling optical waveguide inter coating adhesion. The acid/base character between a plurality of adjacent coating layers is alternated. It is preferred that a first layer of the plurality of layers includes at least one acidic functional group.

EXAMPLE

Figure 2:
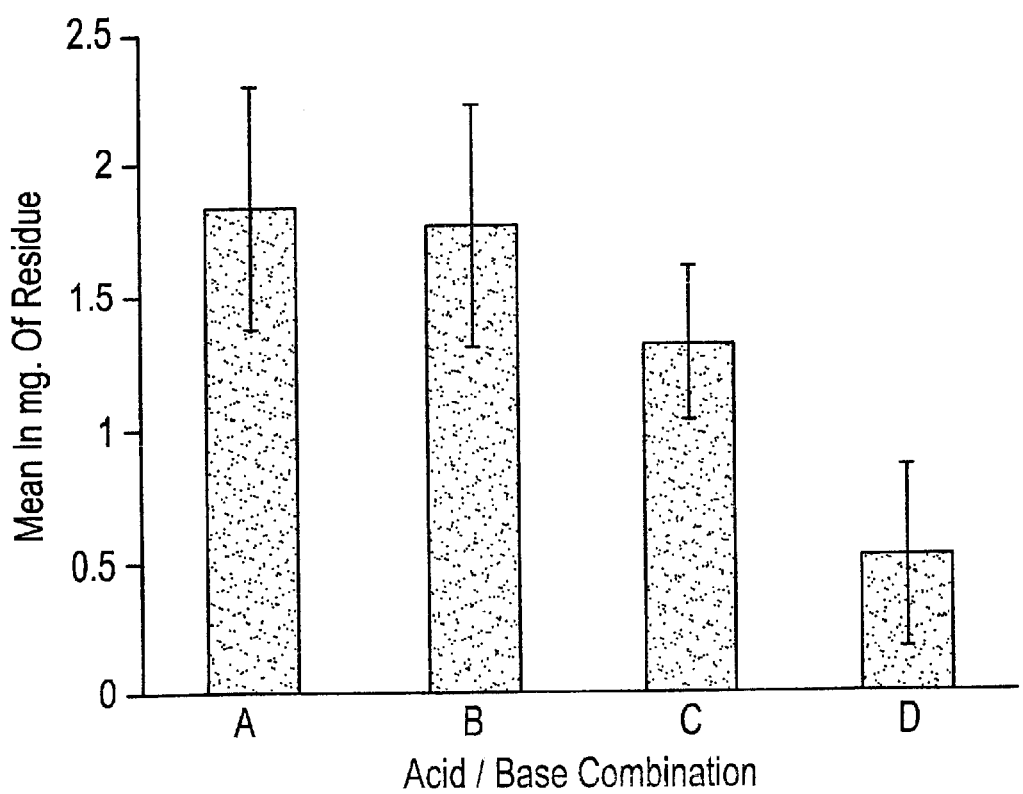
FIG. 2 is a bar graph of the results a scrape test of an OWG coated and inked in accordance with the invention.

The invention will be further clarified by the following example, which is intended to be exemplary of the invention. Four OWGs were coated in accordance with the invention and scrape tested. The results of the test are shown in FIG. 2. The purpose of the scrape test is to give a relative measure of the adhesion of UV-cured inks to optical fibers. The test gives a quantitative value of the amount of ink scraped off using a set procedure.

The test equipment consists of a rewinder capable of transferring optical fiber from one reel to another at a rate of 2647 cm/min (44 cm/sec). The reels have a hub with an outer diameter of 51.6 cm. The payoff stand contains an adjustable brake on a spindle holding the reel, such that the fiber can be transferred smoothly from one reel to the other under tension. The take-up stand consists of a motorized spindle which can rotate the take-up reel, such that it pulls fiber from the payoff stand. The take-up stand is equipped with a counter capable of counting the revolutions of the take-up spindle. The take-up motor should be an adjustable speed motor. An arm with a single-edged razor blade at, or close to its end, is mounted to the take-up stand, such that the blade can be lowered onto the fiber when the fiber is being pulled from the payoff to the take-up reel.

Teflon® blocks are used to hold pressure sensitive adhesive coated tape pieces after weighing and before the ink residue is collected on the tape. The blocks hold that tape such that the sticky side of the tape will not collect dust, yet release the tape easily without transferring any of the Teflon® to the tape. Each block should only have one piece of tape and should be numbered for sample identification. In a typical experiment, five to ten blocks are needed to collect the samples.

A suitable tape is masking tape. A suitable size is 1" wide. 3M Scotch® Brand Masking Tape, Product No. 234 has been identified as a suitable masking tape.

The scrape test procedures include cutting five pieces of 1-inch wide masking tape, each approximately 2.25 inches long. The tape samples are set aside to allow them to lose any solvent residue in the adhesive remaining from the tape manufacture. The tape pieces are weighed on a microbalance capable of weighing to the nearest 0.000001 gram. The balance should be arrested before putting the tape piece on the balance pan and before removing the tape after the weighing. Record the tape weight after a suitable time period for the balance to settle. A suitable microbalance is a Mettler M3 Balance. The tape should not touch the static bar at the rear of the pan. Since the tape is sticky on one side, it is advantageous to fold one corner of the tape over onto itself to provide a place to grip the tape with a pair of forceps. The forceps should not become stuck to the tape. Handle the tape pieces so as to retain their identity and to avoid contamination. The tape pieces may be placed onto the numbered Teflon® blocks. The tape pieces should be removed one at a time.

The reel containing the fiber to be tested is positioned on the spindle of the payoff stand and secured to the spindle with aluminum bushings containing a thumb set screw. The fiber is run from the payoff reel to the take-up reel, going over any pulleys which may be part of the setup. With the take-up motor switch in the off position, the speed adjustment is set to give a take-up spindle rotation rate of 0.855 rev/sec (51.3 rpm, 44 cm/sec). Remove any fiber from the reel which may have been inked while the coloring line was slowing to a stop. Move the payoff reel along its shaft until the razor blade is centered on the fiber being tested and tighten the set screws to the shaft. Install the counter arm on a winder take-up shaft, making sure that the arm engages the counter as it rotates.

The tension on the payoff needs to be adjusted so as to minimize any erratic nature in the tension. This minimizes any bouncing of the razor blade on the fiber during the test. If the razor blade bounces, the tension on the payoff should be adjusted and the test repeated. Once the test can be run with little to no bouncing of the razor blade on the fiber, then the test can be run and data collected.

A paper of a color which contrasts with the color of the ink being tested is placed on the table beneath the razor blade. The paper will provide a spot to collect any ink residue which does not stick to the razor blade and the contrasting color will make it easier to see such fallen residue.

The razor blade is lowered onto the fiber gently. The winder is turned on and fiber is pulled under the razor blade for 10 revolutions of the take-up reel at a speed of 44 cm/sec. After the 516 cm of fiber have been scraped, the blade is gently raised from the fiber and a piece of the pre-weighed tape is used to collect the ink residue from the blade. It may be necessary to practice this procedure several times before the test is actually run. The tape may need to be stuck to the blade several times to collect all of the residue. Collect any residue which may still be hanging onto the fiber. After collecting the ink residue from the blade, the tape is then folded over onto itself such that no sticky surface is showing. The folded tape is then put back with its numbered Teflon block until five such samples have been collected. The fiber pieces of tape are then weighed again on the microbalance and the change in weight of each is calculated.

A new razor blade should be used for each inked fiber sample (a maximum of ten specimens per blade). It is also desirable to run a standard each time this test is run to check for consistency of the test results.

Do not hold the fiber between your fingers after it passes under the razor blade to collect residue which may be carried along on the fiber. Doing so may alter the results of the test in some cases.

The five (or preferably ten) test results are averaged to give the mean amount of residue for the sample. The standard deviation is calculated as part of determining the 95% confidence interval for the mean. The 95% confidence interval is calculated as:

95% Confidence Interval for Mean=$t$(standard deviation)/$sqrt(n)$ where t is derived from statistical tables (for n−1) and equals 2.776 when 5 samples are tested (5% level of significance for two-tailed test) and sqrt (n)=2.236 when n=5. For other numbers of specimens, the factors are:

| n (number of specimens) | Sqrt n | t* |
|---|---|---|
| 5 | 2.236 | 2.776 |
| 6 | 2.449 | 2.571 |
| 7 | 2.646 | 2.447 |
| 8 | 2.828 | 2.365 |
| 9 | 3.000 | 2.306 |
| 10 | 3.162 | 2.262 |

In this example, the variations tested include a fiber coated with a primary coating without any functional groups. The fiber was then coated with a secondary coating. The secondary coating may or may not have included acidic functional groups. An ink was then applied to the secondary coating. The ink may or may not have contained basic functional groups.

The various combinations of the secondary coating formulations and the ink formulations combinations are shown in Table 1.

TABLE 1

Combinations of the coating and the ink formulations used in the scrape test.

| OWG ID | Secondary Coating Formulation | Ink Formulation | Comment |
|---|---|---|---|
| A | Nonacidic | Nonbasic | Plain coating/plain ink |
| B | Acidic | Nonbasic | Acidic coating/plain ink |
| C | Nonacidic | Basic | Plain coating/basic ink |
| D | Acidic | Basic | Acidic coating/basic ink |

The plain coating cited in table 1 is a coating which includes the reactive monomer without an acidic functional group. The acidic coating is the secondary coating which includes 1pph of an acidic reactive monomer. The plain ink did not include a monomer having a basic group. The basic ink did include a monomer containing a basic group.

The formulation for each coating and ink is as follows:

Secondary Coating Formulations:

| Material | Function | Amount in plan secondary | Amount in acidic secondary |
|---|---|---|---|
| Ph 4025 | Monomer | 17% | 17% |
| Ph 4028 | Monomer | 40% | 40% |
| RCC12-984 | Monomer | 30% | 30% |
| BR301 | Oligomer | 10% | 10% |
| I 1850 | Photo-initiator | 3% | 3% |
| EB 170 | Acidic additive | 0 pph | 1 pph |

Monomers

Ph 4025: Henkel Photomer 4025 (Ethoxylated 8 bisphenol A diacrylate)

Source: Henkel Corporation, Ambler, Pa.

Ph 4028: Henkel Photomer 4028 (Ethoxylated 4 bisphenol A diacrylate)

Source: Henkel Corporation, Ambler, Pa.

RCC12-984: Henkel RCC 12-984 (Ethoxylated 2 bisphenol A diacrylate)

Source: Henkel Corporation, Ambler, Pa.

EB 170: UCB Ebecryl 170 (Acrylated acidic adhesion promotor)

Source: UCB Radcure, Smyrna, Ga.

Oligomer

BR301: Bomar BR301 (Poly propylene oxide based urethane diacrylate)

Source: Bomar Specialty Company, Winsted, Conn.

Photo-initiator

I1850: Ciba Geigy Irgacure 1850 (blend of photoinitiators)

Source: Ciba Specialty Chemical, Tarrytown, N.Y.

Ink formulations:

| Material | Function | Amount in Plain Ink | Amount in Basic Ink |
|---|---|---|---|
| Photomer 4127 | Monomer | 30% | 30% |
| Photomer 4072 | Monomer | 35% | 35% |
| V-Cap/RC | Monomer | 10% | 10% |
| BR 3731 | Oligomer | 20% | 20% |
| Resiflow LG-99 | Flow/Wetting Agent | 2% | 2% |
| Irgacure 1850 | Photoinitiator | 3% | 3% |
| Ebecryl 7100 | Basic Oligomer | 0 pph | 5 pph |

Monomers

Ph 4127: Henkel Photomer 4127 (Propoxylated Neopentyl Glycol Diacrylate)

Source: Henkel Corporation, Ambler, Pa.

Ph 4072: Henkel Photomer 4072 (Propoxylated TMPTA)

Source: Henkel Corporation, Ambler, Pa.

V-Cap/RC: Vinyl Caprolactone/Radiation Curable

Source: ISP Corporation, Wayne, N.J.

Oligomers

BR 3731: Bomar BR3731 (Aliphatic Polyether Urethane Acrylate)

Source: Bomar Specialty Company, Winsted, Conn.

Resiflow LG99: Reactive Flow/Wetting Agent

Source: Estron Chemical, Calvert City, Ky.

EB 7100: Ebecryl 7100 (Amine Functional Additive)

Source: UCB Radcure, Smyrna, Ga.

Photoinitiator

Irgacure 1850: Ciba Geigy Irgacure 1850 (Photoinitiator Blend)

Source: Ciba Specialty Chemical, Tarrytown, N.Y.

As shown in FIG. 2, when the coating 20 includes a reactive monomer with acidic functional groups (in this case phosphoric acid) and the ink includes a monomer having basic functional groups (in this case amine) better adhesion occurs between the ink and the coated OWG. Therefore, the example demonstrates the improved adhesion properties of the combination of the secondary coating and the ink, of the invention.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A coated optical waveguide, comprising:

an optical waveguide;

a first coating encompassing said optical waveguide having at least one functional group that is selected from a group consisting of an acidic group or a basic group; and a second coating having at least one functional group wherein said second coating functional group is a basic group when said first coating functional group is an acidic group or said second coating functional group is an acidic group when said first coating functional group is a basic group, said second coating bonded to said first coating.

2. The optical waveguide of claim 1 wherein said second coating is an ink or a ribbon matrix.

3. The optical waveguide of claim 1 further comprising a third coating having at least one functional group that is the same as the functional group of said first coating.

4. The optical waveguide of claim 3 wherein said third coating is a ribbon matrix.

5. The optical waveguide of claim 3 wherein said third coating is an outer coating of said second coating.

6. The optical waveguide of claim 1 wherein said first coating contains an acidic group.

7. The optical waveguide of claim 1 wherein said first coating contains a basic group.

8. The optical waveguide of claim 1 wherein said basic group is derived from an amine.

9. The optical waveguide of claim 1 wherein said acidic group is derived from phosphoric acid.

10. The optical waveguide of claim 1 wherein a concentration of the acidic functional group containing component is at least 0.01% by weight of said first coating or said second coating.

11. The optical waveguide of claim 1 wherein said bonding between said first coating and said second coating contains ionic interaction.

12. The optical waveguide of claim 1 further comprising said acidic group in an amount greater than a stoichiometric amount of said basic group.

13. The optical waveguide of claim 1 further comprising an inner coating disposed between said waveguide and said first coating.

14. The optical waveguide of claim 1 wherein said first coating includes a plurality of functional groups and said second coating includes a plurality of functional groups.

15. The optical waveguide of claim 1 wherein said second coating is an outer coating in relation to said first coating.

16. The optical waveguide according to claim 1 wherein said first coating comprises at least one acrylated component.

17. The optical waveguide according to claim 16 wherein said acrylated component comprises at least one of a monomer, an oligomer, and combinations thereof.

18. The optical waveguide according to claim 16 wherein said functional group of said first coating comprises an acidic group.

19. The optical waveguide according to claim 1 wherein said second coating comprises an UV coating.

20. The optical waveguide according to claim 1 wherein said waveguide comprises a glass cladding.

21. A method of coating an optical waveguide comprising the steps of:

applying a first coating to the optical waveguide, the first coating having at least one functional group that is selected from a group consisting of an acidic group or a basic group; and applying a second coating having at least one functional group wherein the second coating functional group is a basic group when the first coating functional group is an acidic group or the second coating functional group is an acidic group when the first coating functional group is a basic group, thereby bonding the second coating to the first coating.

22. The method of claim 21 further comprising the step of applying a third coating upon the second coating, the third coating having at least one functional group that is the same as the functional group of the first coating.

23. The method of claim 21 wherein the first coating applied contains the acidic group in an amount greater than a stoichiometric amount of the basic group.

24. The method of claim 21 further comprising bonding the second coating to the first coating with bonds that contain ionic interaction.

25. A method of controlling optical waveguide inter coating adhesion comprising alternating acid/base character between a plurality of adjacent coating layers.

26. The method of claim 25 wherein a first layer of the plurality of layers includes at least one functional acidic group.

27. The method of claim 26 wherein the plurality of layers includes the acidic functional group in greater than a stoichiometric amount of at least one basic functional group.

* * * * *